United States Patent [19]

Dooley

[11] 4,112,819
[45] Sep. 12, 1978

[54] APPARATUS FOR PRODUCING CAMS

[76] Inventor: Richard A. Dooley, 400 S. Westwood Ave., Toledo, Ohio 43609

[21] Appl. No.: 772,076

[22] Filed: Feb. 25, 1977

[51] Int. Cl.² .............................................. B23C 1/18
[52] U.S. Cl. ...................................... 90/13.9; 90/13.6; 90/13 R
[58] Field of Search ...................... 90/13.9, 13.6, 13.7, 90/13.3, 13 R, 13.1

[56] References Cited

U.S. PATENT DOCUMENTS

| 3,213,538 | 10/1965 | Trenka | 90/13.6 |
| 3,799,028 | 3/1974 | Coverdale, Jr. | 90/13 R |

Primary Examiner—Gil Weidenfeld
Attorney, Agent, or Firm—Allen D. Gutchess, Jr.

[57] ABSTRACT

Apparatus for producing cams is provided and specifically a machine for cutting conjugate disc cams for swinging roller followers. The apparatus includes means for holding and rotating a cam blank, a cutting tool, and a pivoted arm carrying the tool adjacent the edge of the blank, the arm also having a pointer for following a line on a moving chart. As the arm is pivoted when the line is followed, the cutting tool machines the edge of the cam blank and produces a cam of the desired shape. Preferably, two cams are formed at the same time by the cutting tool, the cam blanks overlapping and being rotated together.

14 Claims, 5 Drawing Figures

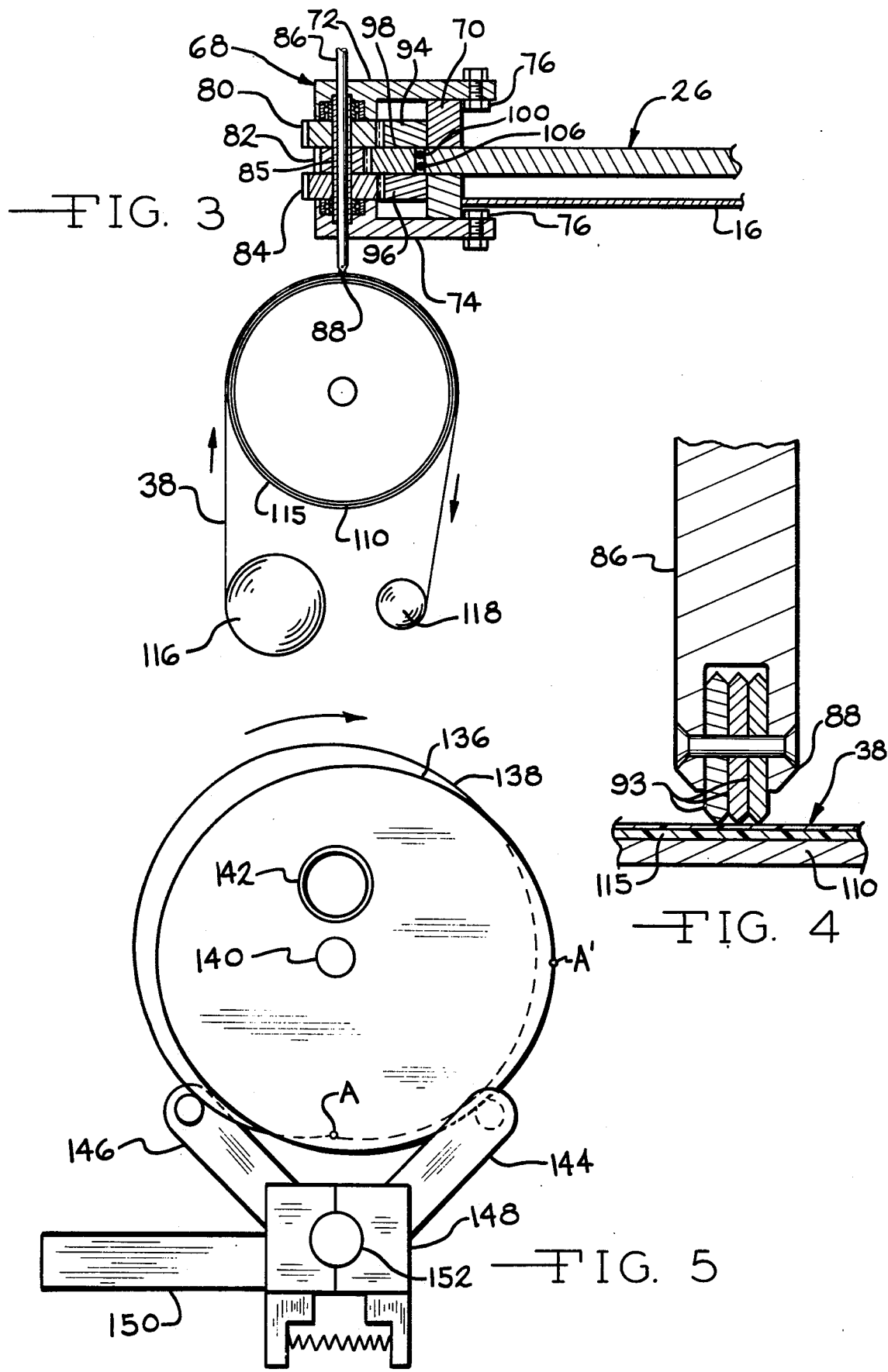

4,112,819

APPARATUS FOR PRODUCING CAMS

This invention relates to apparatus for producing cams and specifically to shaping conjugate disc cams for use with swinging roller followers.

A machine for shaping cams in accordance with the invention is designed to produce cams in low quantities to perform specific functions. The machine includes means for holding and rotating a cam blank and a cutting tool located adjacent an edge of the cam blank. The cutting tool is carried by an arm which is pivotally mounted on the machine at one end and has a pointer at the other end. The machine also includes a drive unit, preferably located at the pivot point for the arm, which rotates the cutting tool. A chart having a line previously drawn thereon is positioned adjacent the pointer of the arm and is moved at a rate coordinated with the rotation of the cam blank. The pointer is aligned with the line and pivots the arm as the pointer is maintained in alignment with the chart line. The movement of the arm back and forth causes the cutting tool to machine and shape the cam blank to the desired final shape for the cam during movement through one revolution.

In a preferred form, two cam blanks are used with edge portions lying in overlapping relationship so that the cutting tool machines the edges of both cam blanks as they are simultaneously rotated through one revolution. The two shaped cams can then be used with two cam followers to provide a positive motion as compared to a single cam with a single cam follower which is spring loaded against the edge of the cam.

The machine according to the invention also includes a unique rack and pinion mechanism to facilitate the pivotal movement of the cutting tool arm and to more easily maintain the pointer in alignment with the moving line of the chart.

It is, therefore, a principal object of the invention to provide apparatus for shaping cams from cam blanks.

Another object of the invention is to provide apparatus for shaping cams which is relatively low in cost, low in maintenance, and easy to use.

A further object of the invention is to provide a machine for shaping cams from cam blanks with the shape being determined by a line on a moving chart.

Many other objects and advantages of the invention will be apparent from the following detailed description of a preferred embodiment thereof, reference being made to the accompanying drawings, in which:

FIG. 3 is a somewhat schematic view in transverse cross section, taken along the line 3—3 of FIG. 2;

FIG. 4 is an enlarged, detailed view in cross section of a lower end of a pointer; and FIG. 5 is a diagrammatic front view in elevation of apparatus utilizing the cams produced on the machine of FIGS. 1-4.

Figure 1:
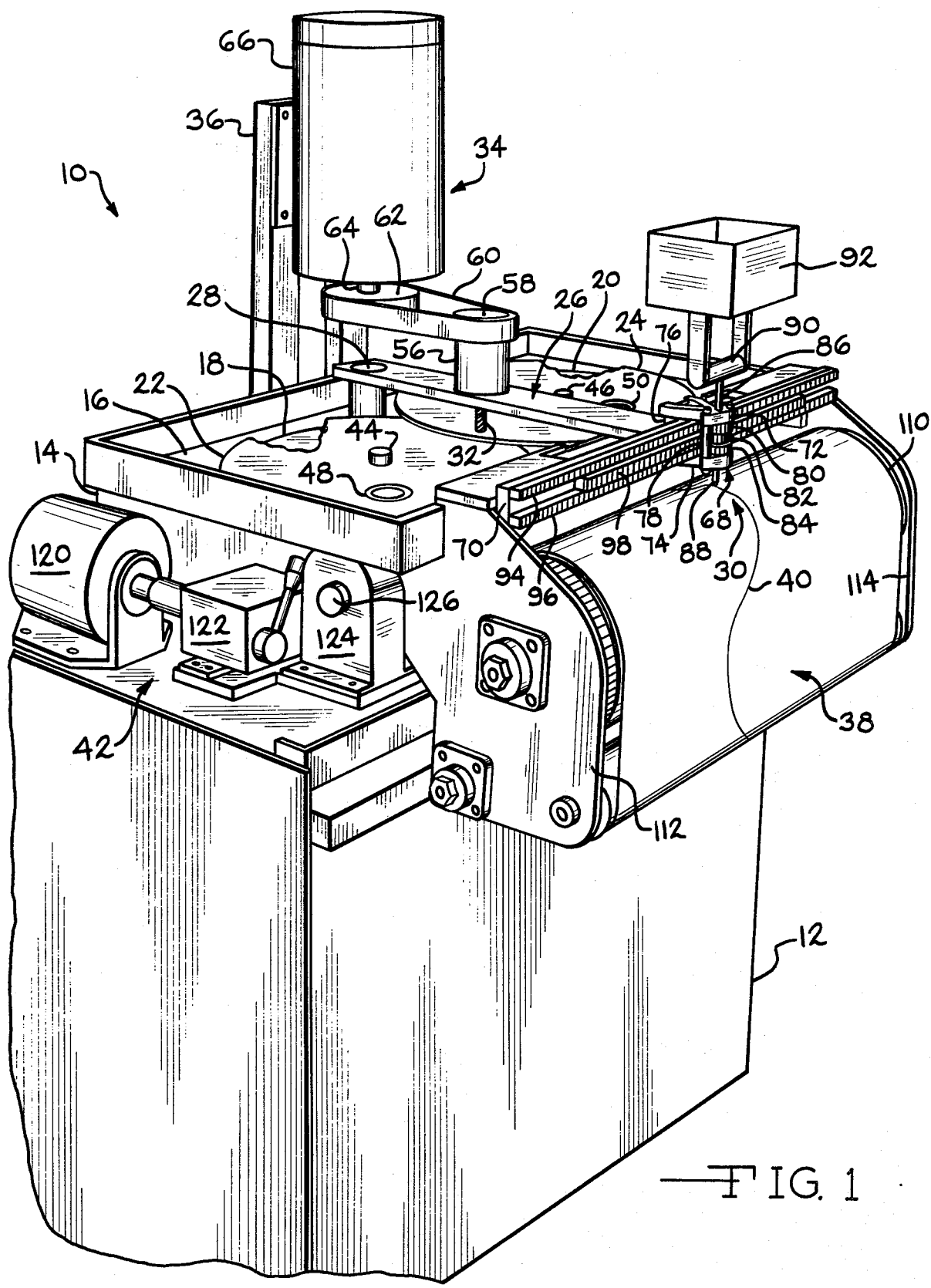
FIG. 1 is a fragmentary view in perspective, with parts broken away, of a cam cutting machine embodying the invention.

Referring to the drawings, and particularly to FIG. 1, a machine according to the invention is indicated at 10 and includes a base 12 and an upper housing 14 forming a work platform 16. Two turntables 18 and 20 are located on the platform 16 and are at different levels to support two cam blanks 22 and 24 in overlapping relationship. A cutter arm 26 is pivotally supported by a pivot pin 28 at a rear portion of the platform 16 between the turntables 18 and 20 and is connected to a pointer assembly 30 at the forward end thereof. A rotary cutter or cutting tool 32 is rotatably supported by the arm 26 between the pivot pin 28 and the pointer assembly 30. A drive unit indicated at 34 for rotating the cutter is positioned above the pivot pin 28 and is mounted on a supporting bar 36 behind the platform 16. A chart or graph 38, preferably of Mylar or similar material, is located in front of the platform 16 and has a line 40 thereon which the pointer assembly 30 follows as the chart is moved. A drive unit 42 rotates the turntables 18 and 20 and moves the chart 38, as will be discussed subsequently.

Referring in more detail to the components of the cam cutting machine 10, the turntables 18 and 20 have radii less than the minimum radii of the cams to be cut from the blanks 22 and 24. The turntables are mounted on shafts 44 and 46 which extend downwardly through the platform 16 and the turntables also have positioning posts 48 and 50 extending upwardly therefrom through holes 52 and 54 in the cam blanks 22 and 24. The posts position the blanks on the turntables in accurate, predetermined relationship relative to one another.

The cutter 32 is of a conventional design and cuts square edges on the cam blanks 22 and 24, which edges are perpendicular to the main surfaces of the cams. The cutter 32 is rotatably held in a bearing block 56 which is threadably mounted in the arm 26. The threaded mount enables the bearing block 56 to be adjusted so that the cutter 32 can be raised or lowered to a desired vertical position, and the bearing block 56 can also be completely removed from the arm 26 along with the cutter 32. The cutter 32 is rotated by the drive unit 34 through a driven pulley 58 connected by a belt 60, preferably a timing belt, to a drive pulley 62. The drive pulley 62 is affixed to a vertical shaft 64 extending into a suitable motor 66. The shaft 64 is axially aligned with the pivot pin 28 so that the distance between the driven and drive pulleys 62 and 68 remains constant even when the arm 26 is pivoted. The motor 66 is mounted directly on the supporting bar 36.

The pointer assembly 30 moves with the arm 26 but, in a preferred form, is not affixed directly to it. Rather, a mechanical arrangement connects the pointer assembly and the arm to enable the pointer assembly to move transversely relative to the longitudinal extent of the arm a greater distance than the arm moves or pivots. This reduces errors resulting from less than precise tracking of the line 40 by the pointer assembly and provides a greater mechanical advantage for moving the cutter against the cam blanks. For this purpose, the pointer assembly 30 has a bracket 68 (FIGS. 1-3) extending around a guide and supporting bar 70 positioned parallel to the transverse path of the pointer assembly 30, being suitably affixed to the upper housing 14. The bracket 68 has upper and lower members 72 and 74 extending above and below the guide bar 70 with each terminating in a pair of rollers 76 which bear against the back of the guide bar 70. At the front, the upper and lower members 72 and 74 are spaced apart by spacers 78 and have three pinion gears 80, 82, and 84 therebetween which are affixed together on a common tubular shaft 85 rotatably carried in bearings in the members 72 and 74. A pointer axle 85 extends through the center of this tubular shaft, terminating at its lower end in a pointer 88. The upper end of the axle 86 extends to a handle 90 which enables the operator to manipulate the pointer 88 to track along the line 40 on the chart 38. A container 92 above the handle 90 carries weights, if desired. These determine the force of the pointer 88 on the chart 38 with the axle 86 being vertically slidable relative to the bracket 68, the tubular shaft 85, and the gears 80-84.

The lower end of the pointer 88 preferably carries at least one smaller roller 93 (FIG. 4), and preferably three, which are similar to the rollers found in glass cutters. The rollers tend to bite into the Mylar chart to provide resistance to transverse movement, thereby enabling better control over the force of the cutter on the cam blanks. If desired, additional rollers can be used in side-by-side relationship to spread the force on the chart, as many as five such rollers actually having been used. The handle 90 can be turned to steer the rollers of the pointer while the weights in the container 92 facilitate control of the pointer by the operator.

The upper and lower pinion gears 80 and 84 mesh with stationary racks 94 and 96 which are affixed to the guide bar 70. The intermediate, smaller pinion gear 82 meshes with a thicker, movable gear rack 98 which is located between the stationary racks 94 and 96. When the pointer 88 is moved transversely, the pinion gears 80 and 84 are caused to rotate, being in mesh with the stationary gear racks 94 and 96. These, in turn, rotate the intermediate pinion gear 82 which causes the rack 98 to move back and forth, but to a much lesser extent than the movement of the pointer 88. Movement of the movable gear rack 98 causes the cutter arm 26 to pivot back and forth, again through a much smaller distance than the distance the pointer 88 is moved.

To connect the movable gear rack 98 to the cutter arm 26, a first cable 100 (FIGS. 2 and 3) is affixed, as by a ball swaged thereon, to one end of the movable gear rack 98 and extends around an enlarged portion 102 of the cutter arm 26 where it is affixed by a threaded fitting 104 to enable the tension in the cable 100 to be adjusted. Similarly, a cable 106 is affixed to the other end of the movable gear rack 98 and extends around the other end of the enlarged portion 102 of the cutter arm 26 and is affixed by an adjustable threaded fitting 108. The cables 100 and 106 are spaced slightly apart vertically so as not to interfere with one another and extend through a slot which is located in the back of the guide bar 70.

The rack and pinion arrangement is discussed more fully in my U.S. Pat. No. 3,827,309. The ratios of the rack and pinions are such that the movement of the pointer 88 from one edge of the chart 38 to the other causes the cutter arm 26 and the cutter 32 to move a distance equal to the distance between a maximum high point and the minimum low point desired for any set of cams to be produced. By way of example, a 24 inch movement of the pointer 88 across the chart 38 will result in a 3-inch movement of the cutter 32 between the shafts 44 and 46. This arrangement reduces the magnitude of errors in the tracking of the pointer 88 on the line 40 and also provides a mechanical advantage to enable the operator to forceably move the cutter 32 more easily relative to the cam blanks 22 and 24 through the transverse movement of the pointer 88.

The chart 38 moves over a large diameter supporting drum 110 which is rotatably carried by side plates 112 and 114 extending forwardly of the base 12. The drum 110 preferably has a resilient layer or covering 115 (FIG. 4) thereon, such as vinyl, to further resist transverse movement of the pointer 88 on the chart 38 by enabling the rollers 93 to bite into the chart 38 deeper, without damaging the chart. The chart moves from a forward supply roll 116 over the drum 110 and to a take-up roll 118, as the drum 110 is rotated.

The rotatable movement of the turntables 18 and 20 is coordinated with the movement of the chart 38 and the drum 110 by the drive unit 42. This includes a suitable motor 120 connected to a manually-manipulated speed control 122. The speed control connects through a right angle gear box 124 to a drive shaft 126 extending through the upper housing 14. THe shaft 126 has worm gears 128 and 130 (FIG. 2) which mesh with worm wheels 132 and 134 affixed to the turntable shafts 44 and 46 to cause them to rotate. A spur gear 132 on the drive shaft 126 meshes with a spur gear 134 affixed to the drum 110 to cause it to rotate.

The drive arrangement for the turntables and the drum 110 is such that the turntables will make one revolution when the chart 38 has moved from one end throughout its length to the other end. This large movement of the chart relative to the turntables and the cam blanks 22 and 24 also helps to minimize errors in the cams being cut due to errors in the movement of the pointer 88 relative to the chart line 40 or due to errors in the chart line 40 itself.

Figure 2:
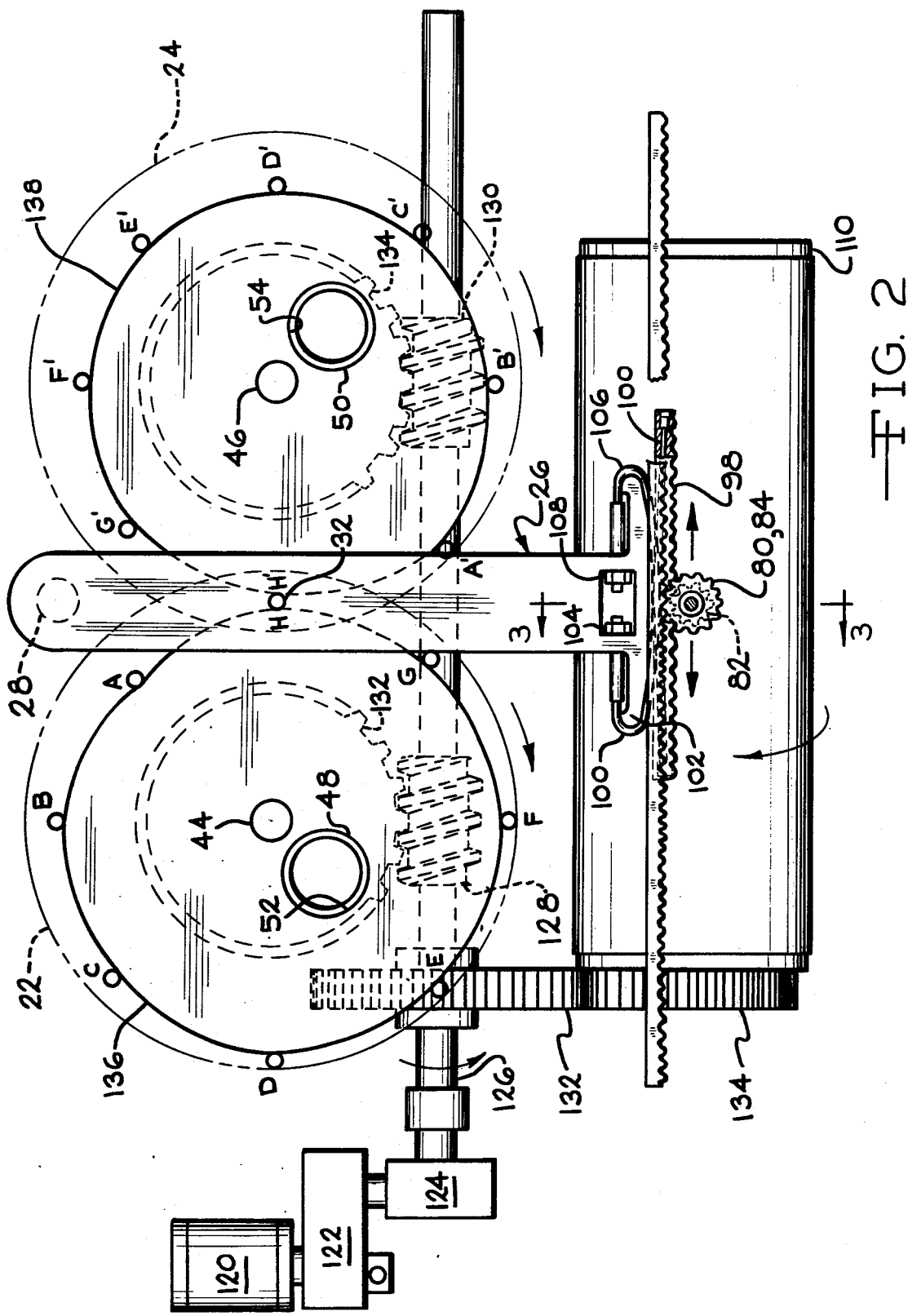
FIG. 2 is a schematic plan view of certain components of the machine of FIG. 1.

In the operation of the cam cutting machine 10, the cam blanks 22 and 24 are positioned in overlapping relationship on the turntables 18 and 20 with the posts 48 and 50 being in a predetermined relationship on the machine. Thus, for example, the axes of the shaft 44 and the positioning post 48 can be such that a line drawn therethrough intersects the axis of the pivot pin 28, as shown in FIG. 2; a similar relationship then exists for the shaft 46 and the post 50. Of course, the holes 52 and 54 in the cam blanks 22 and 24 and openings for the shafts 44 and 46 will already been formed in the cam blanks. The overlap of the cam blanks 22 and 24 will be sufficient so that the cutter 32 will always be in contact with both of the blanks, even for the highest point to be formed on one of the blanks and the lowest point on the other.

With the cam blanks positioned, holes are then drilled through both of the cam blanks 22 and 24 in alignment and in the position to be assumed by the cutter 32 when the machine is started. The cutter 32 is then inserted into those holes with the bearing block 56 being assembled with the arm 26. At this time, the chart 38 is rolled on the supply roll 116 with its leading edge affixed to the take-up roll 118. The pointer 88 is also aligned with the beginning of the chart line 40 before the holes are drilled into the cam blanks and the cutter inserted.

When the drive units 34 and 42 are actuated, the cam blanks 22 and 24 begin to rotate in clockwise directions, in this instance, as shown in FIG. 2. At the same time, the chart 38 begins to move toward the machine over the drum 110. The operator then manipulates the handle 90 to steer the pointer 88 along the line 40 which moves the cutter arm 26 back and forth about the pivot pin 28. This causes the cutter 32 to shape both edges of the cam blanks 22 and 24 simultaneously with this operation continuing until the chart 38 has moved through its length and the cam blanks 22 and 24 have moved through one revolution. The speed of the chart and cam blanks can be controlled by the speed control 122 with the relative movement of the cam blanks and chart to one another always remaining the same.

One revolution of the cam blanks 22 and 24 results in two finished cams 136 and 138 (FIG. 2). The distance from a given point on the periphery of the cam 136 to its center and the distance from a corresponding point on the periphery of the cam 138 to its center, plus the diameter of the cutter 32, will always equal the distance between the axes of the shafts 44 and 46. For example, the distance from point A on the periphery of the cam 44 to its center and the distance from point A' on the periphery of the cam 138 to its center, along with the diameter of the cutter 32 equals the distance between the axes of the shafts 44 and 46.

While the instant invention is not limited to any particular use for the final cams 136 and 138, they can be employed with a control cabinet for manipulating a tool as shown in my aforementioned U.S. Pat. No. 3,827,309. While that patent shows a single follower arm which is spring loaded, two follower arms can be used, one with each of two cams to provide a positive mechanical motion not obtainable with the single spring loaded follower.

Referring to FIG. 5, the two cams 136 and 138 can be mounted on a common drive shaft 140 with the cam openings 52 and 54 aligned with a guide tube 142 which properly positions the cams relative to one another on the shaft. Cam followers 144 and 146, which can be swinging roller followers, engage the cams 136 and 138 respectively. The followers are mounted on a common break-away hub 148 which is connected to a suitable actuating arm 150 on an axle 152, the hub being manipulated by the cams to provide a desired motion. The hub 148 has break-away provisions to separate the cam followers from the cams if interference with the object manipulated by the control arm 150 or mechanical jamming should occur.

With this specific arrangement of the cams 136 and 138, the distance from the follower arm axle 152 to the contacts of the followers 144 and 146 with the cams 136 and 138 equals the distance from the axis of the pivot pin 28 to the axis of rotation of the cutter 32. Also, the distance from the axis of the follower arm axle 152 to the axis of the cam shaft 140 equals the distance from the axis of the pivot pin 28 to the axes of the turntable shafts 44 and 46.

Various modifications of the above-described preferred embodiment of the invention will be apparent to those skilled in the art, and it is to be understood that such modifications can be made without departing from the scope of the invention, if they are within the spirit and the tenor of the accompanying claims.

I claim:

1. Apparatus for shaping cams from cam blanks comprising a housing, a cutting tool, an arm rotatably carrying said cutting tool, said arm being pivotally connected to said housing on one side of said cutting tool and said arm being connected to a pointer on the other side of said cutting tool, first means and second means on said housing for holding and rotating a first cam blank and a second cam blank, respectively, said first and second holding and rotating means being located between the pointer and the pivotal connection to the housing and being laterally spaced apart to each side of said pivotal connection for supporting the first and second cam blanks in an overlapping relationship, whereby said cutting tool can engage and shape both of said cam blanks simultaneously.

2. Apparatus according to claim 1 characterized by means in said housing for rotating said first and second holding and rotating means in common directions.

3. Apparatus according to claim 1 characterized by drive means having an axis aligned with the axis of the arm pivot to rotate said cutting tool.

4. Apparatus according to claim 1 characterized by said means connecting said pointer and said arm enabling said pointer to move in a direction transverse to the longitudinal extent of said arm a greater distance than a portion of said arm to which said pointer is connected.

5. Apparatus for shaping cams from cam blanks comprising a housing, a shaping tool, an arm carrying said shaping tool, said arm being pivotally connected to said housing, a pointer connected to said arm, first means and second means for holding a first cam blank and a second cam blank, respectively, means for rotating said first and second holding means, said first and second holding means being located between the pointer and the pivotal connection to the housing and being laterally spaced apart to each side of said pivotal connection for supporting the first and second cam blanks in an overlapping relationship, whereby said shaping tool can engage and shape both of said cam blanks simultaneously, sheet material having a line thereon, and means for moving said sheet material to move said line relative to said pointer.

6. Apparatus according to claim 5, characterized by said rotating means rotates both of said holding means in common directions.

7. Apparatus for shaping cams from cam blanks comprising a housing, means on said housing for holding a cam blank, a shaping tool, an arm carrying said shaping tool, said arm being pivoted to said housing, a pointer connected to said arm, sheet material having a line thereon, means for moving said sheet material to move said line relative to said pointer, and mechanical means connecting said pointer to said arm effective to enable said pointer to be moved transversely to the longitudinal extent of said arm a greater distance than the portion of said arm to which said pointer is connected.

8. Apparatus according to claim 7 characterized by said connecting means comprising at least two pinions movable with said pointer, at least two gear racks meshing with said pinions, means for holding one of said gear racks in a stationary position, and the other of said gear racks being connected with said arm.

9. Apparatus for shaping cams from cam blanks comprising a housing, means on said housing for holding a cam blank, a shaping tool, an arm carrying said shaping tool, said arm being pivoted to said housing, a pointer connected to said arm, sheet material having a line thereon, means for moving said sheet material to move said line relative to said pointer, and at least one roller rotatably mounted on the lower end of said pointer.

10. Apparatus according to claim 9 characterized by there being at least one additional roller rotatably mounted in side-by-side relationship with said roller on a common axle.

11. Apparatus according to claim 9 characterized by said pointer having a handle located above said roller to enable an operator to steer said roller.

12. Apparatus for shaping cams from cam blanks comprising a housing, means on said housing for holding a cam blank, a shaping tool, an arm carrying said shaping tool, said arm being pivoted to said housing, a pointer connected to said arm, sheet material having a line thereon, means for moving said sheet material to move said line relative to said pointer, said sheet material being of plastic, and said moving means comprising a drum located adjacent said pointer and being rotatable about an axis transverse to the direction of said pointer.

13. Apparatus according to claim 12 characterized by said drum having a resilient layer thereon between said drum and said sheet material.

14. Apparatus for shaping cams from cam blanks comprising a housing, means on said housing for holding a cam blank, a shaping tool, an arm carrying said shaping tool, said arm being pivoted to said housing, a pointer connected to said arm, sheet material having a line thereon, a drum located adjacent said pointer, a supply roll for said sheet material, and a take-up roll for said sheet material, said sheet material being fed between said drum and said pointer when moving from said supply roll to said take-up roll.

* * * * *